US008886676B2

(12) United States Patent
Mansfield et al.

(10) Patent No.: US 8,886,676 B2
(45) Date of Patent: Nov. 11, 2014

(54) RECONSTRUCTION OF LISTS IN A DOCUMENT

(71) Applicant: Apple Inc., Cupertino, CA (US)

(72) Inventors: Philip Andrew Mansfield, Vancouver (CA); Michael Robert Levy, Vancouver (CA)

(73) Assignee: Apple Inc., Cupertino, CA (US)

(*) Notice: Subject to any disclaimer, the term of this patent is extended or adjusted under 35 U.S.C. 154(b) by 1 day.

(21) Appl. No.: 13/764,761

(22) Filed: Feb. 11, 2013

(65) Prior Publication Data
US 2013/0227406 A1    Aug. 29, 2013

Related U.S. Application Data

(62) Division of application No. 13/106,806, filed on May 12, 2011, now Pat. No. 8,380,753.

(60) Provisional application No. 61/433,951, filed on Jan. 18, 2011, provisional application No. 61/433,959, filed on Jan. 18, 2011.

(51) Int. Cl.
G06F 17/30 (2006.01)
G06F 17/27 (2006.01)
G06F 17/22 (2006.01)

(52) U.S. Cl.
CPC ........ G06F 17/2241 (2013.01); G06F 17/2745 (2013.01); G06F 17/30 (2013.01)
USPC ............ 707/791; 707/802; 707/822; 707/828

(58) Field of Classification Search
CPC ...................................................... G06F 17/30
USPC .................................................. 707/600–899
See application file for complete search history.

(56) References Cited

U.S. PATENT DOCUMENTS 5,335,290 A    8/1994    Cullen et al.
5,379,373 A    1/1995    Hayashi et al.
5,555,556 A    9/1996    Ozaki (Continued)

FOREIGN PATENT DOCUMENTS

AU    2012200110    8/2013
CN    101361063    2/2009

(Continued)

OTHER PUBLICATIONS

Nakajima, Noboru, et al., Document Layout and Reading Sequence Analysis by Extended Split Detection, the 55th lecture collection of paper of National Convention (2), artificial intelligence and cognitive science, Sep. 24, 1997, Information Processing Society of Japan, Japan.

(Continued)

*Primary Examiner* — Isaac M Woo
(74) *Attorney, Agent, or Firm* — Adeli LLP

(57) ABSTRACT

Some embodiments provide a method for analyzing a document that includes several primitive elements. The method identifies that a set of primitive elements include an implicit list in the document based on location and appearance of the set of primitive elements. The method defines the identified implicit list as an explicit list. The method stores the explicit list as a structure associated with the document.

25 Claims, 15 Drawing Sheets

(56) References Cited

U.S. PATENT DOCUMENTS

| | | |
|---|---|---|
| 5,669,007 A | 9/1997 | Tateishi |
| 5,680,478 A | 10/1997 | Wang et al. |
| 5,689,585 A | 11/1997 | Bloomberg et al. |
| 5,708,730 A | 1/1998 | Itonori |
| 5,784,487 A | 7/1998 | Cooperman |
| 5,841,900 A | 11/1998 | Rahgozar et al. |
| 5,848,186 A | 12/1998 | Wang et al. |
| 5,856,877 A | 1/1999 | Burger et al. |
| 5,907,631 A | 5/1999 | Saitoh |
| 5,987,171 A | 11/1999 | Wang |
| 6,014,680 A | 1/2000 | Sato et al. |
| 6,173,073 B1 | 1/2001 | Wang |
| 6,175,844 B1 | 1/2001 | Stolin |
| 6,377,704 B1 | 4/2002 | Cooperman |
| 6,562,077 B2 | 5/2003 | Bobrow et al. |
| 6,687,404 B1 | 2/2004 | Hull et al. |
| 6,757,870 B1 | 6/2004 | Stinger |
| 6,801,673 B2 | 10/2004 | Chao et al. |
| 6,910,182 B2 | 6/2005 | Huang |
| 6,928,610 B2 | 8/2005 | Brintzenhofe et al. |
| 7,142,728 B2 | 11/2006 | Wnek |
| 7,249,318 B1 | 7/2007 | Corell et al. |
| 7,313,754 B2 | 12/2007 | McLure et al. |
| 7,386,789 B2 | 6/2008 | Chao et al. |
| 7,392,473 B2 | 6/2008 | Meunier |
| 7,433,517 B2 | 10/2008 | Kato et al. |
| 7,555,711 B2 | 6/2009 | Chao et al. |
| 7,623,710 B2 | 11/2009 | Simard et al. |
| 7,890,852 B2 | 2/2011 | Wason |
| 8,245,131 B2 | 8/2012 | Chao et al. |
| 8,261,186 B2 | 9/2012 | Mansfield et al. |
| 8,352,855 B2 | 1/2013 | Levy et al. |
| 8,365,072 B2 | 1/2013 | Mansfield et al. |
| 8,380,753 B2 | 2/2013 | Mansfield et al. |
| 8,438,472 B2 | 5/2013 | Mansfield et al. |
| 8,443,278 B2 | 5/2013 | Mansfield et al. |
| 8,473,467 B2 | 6/2013 | Levy et al. |
| 8,719,701 B2 | 5/2014 | Mansfield et al. |
| 2002/0194379 A1 | 12/2002 | Bennett et al. |
| 2004/0006742 A1 | 1/2004 | Slocombe |
| 2004/0146199 A1 | 7/2004 | Berkner et al. |
| 2004/0194035 A1 | 9/2004 | Chakraborty |
| 2005/0289456 A1 | 12/2005 | Bier |
| 2006/0155700 A1 | 7/2006 | Dejean et al. |
| 2006/0248070 A1 | 11/2006 | Dejean et al. |
| 2006/0271847 A1 | 11/2006 | Meunier |
| 2007/0002054 A1 | 1/2007 | Bronstein |
| 2007/0009161 A1 | 1/2007 | Hollingsworth |
| 2007/0038927 A1 | 2/2007 | Dallett et al. |
| 2007/0220055 A1* | 9/2007 | Gong et al. ............ 707/200 |
| 2007/0250497 A1 | 10/2007 | Mansfield et al. |
| 2007/0256010 A1 | 11/2007 | Blackmon et al. |
| 2008/0263032 A1 | 10/2008 | Vailaya et al. |
| 2009/0284780 A1 | 11/2009 | Kitora et al. |
| 2010/0145720 A1 | 6/2010 | Reiner |
| 2010/0174978 A1 | 7/2010 | Mansfield et al. |
| 2010/0174979 A1 | 7/2010 | Mansfield et al. |
| 2010/0174980 A1 | 7/2010 | Mansfield et al. |
| 2010/0174985 A1 | 7/2010 | Levy et al. |
| 2013/0042172 A1 | 2/2013 | Mansfield et al. |
| 2013/0185631 A1 | 7/2013 | Mansfield et al. |
| 2013/0311490 A1 | 11/2013 | Mansfield et al. |

FOREIGN PATENT DOCUMENTS

| | | |
|---|---|---|
| EP | 2477124 | 7/2012 |
| JP | S63-046565 | 2/1988 |
| JP | H09-179937 | 7/1997 |
| JP | 11-250041 | 9/1999 |
| JP | 2001-101164 | 4/2001 |
| JP | 2003-288334 | 10/2003 |
| JP | 2004-234656 | 8/2004 |
| JP | 2005-149269 | 6/2005 |
| JP | 2006-134036 | 5/2006 |
| JP | 2008-097436 | 4/2008 |
| JP | 2009-110500 | 5/2009 |
| RU | 2007-141666 | 5/2009 |
| TW | 200805092 | 1/2008 |
| TW | 200917057 | 4/2009 |
| TW | 201025049 | 7/2010 |
| TW | I334551 | 12/2010 |
| WO | WO 2012/099803 | 7/2012 |

OTHER PUBLICATIONS

Yamada, Mitsuru, Conversion Method from Document Image to Logically Structured Document Based on ODA, the transactions of the Institute of Electronics, Information and Communication Engineers (J76-D-11), Nov. 25, 1993, vol. J76-DII No. 11, Japan.

U.S. Appl. No. 13/866,493, filed Apr. 19, 2013, Mansfield, Philip Andrew, et al.

International Search Report and Written Opinion of PCT/US2012/021387, Apr. 30, 2012 (mailing date), Apple Inc.

International Preliminary Report on Patentability PCT/US2012/021387, Aug. 1, 2013 (mailing date), Apple Inc.

Portions of prosecution history of EP 12150776, Jan. 14, 2013 (mailing date), Apple Inc.

Altamura, Oronzo, et al., "Transforming Paper Documents into XML Format with Wisdom++," Month Unknown, 2001, International Journal on Document Analysis and Recognition, pp. 2-17.

Beusekom, Joost Van, "Diploma Thesis: Document Layout Analysis," Image Understanding and Pattern Recognition Group, Department of Computer Science, Month Unknown, 2006, pp. 1-67, Technische Universität Kaiserslautern.

Breuel, Thomas M., "High Performance Document Layout Analysis," Proceedings of Symposium on Document Image Understanding Technology, Apr. 9-11, 2003, 15 pages, University of Maryland, Maryland, USA.

Chao, Hui, et al., "Layout and Content Extraction for PDF Documents," Lecture Notes in Computer Science: Document Analysis Systems VI, Sep. 8-10, 2004, pp. 213-224, vol. 3163/2004, Springer-Verlag Berlin Heidelberg.

Kanahori, Toshiro, et al., "Scientific English PDF Documentation Reader for Visually Impaired People Utilizing Embedded Text Information," Journal of IEICE, Japan, The Institute of Electronics Information and Communication Engineers, Mar. 1, 2007, vol. J90-D, No. 3, p. 706-714.

Khramov, Yuri, et al., "Extracting Semantic Knowledge from PDF publications," XML 2001 Conference Paper, Dec. 2001, pp. 1-7, SchemaSoft, Vancouver, British Columbia, Canada.

Lovegrove, William S., et al., "Document Analysis of PDF Files: Methods, Results and Implications," Electronic Publishing, Jun. & Sep. 1995, pp. 207-220, vol. 8(2&3), John Wiley & Sons, Ltd.

Namboodiri, Anoop M., et al., "Document Structure and Layout Analysis, Digital Document Processing," Mar. 13, 2007, pp. 29-48, Springer London, International Institute of Information Technology, Hyderabad, India and Michigan State University, East Lansing, MI-48824, USA.

Namboodiri, Anoop, et al., "Document Structure and Layout Analysis, Advances in Pattern Recognition, Digital Document Processing," Month Unknown, 2007, ISSN:1617-7916, DOI 10.1007/978-1-84628-726-8, ISBN 978-1-84628-501-1, pp. 1-17, International Institute of Information Technology, Hyderabad, India and Michigan State University, East Lansing, MI-48824, USA.

O'Gorman, Lawrence, "The Document Spectrum for Page Layout Analysis," IEEE Transactions on Pattern Analysis and Machine Intelligence, Nov. 1993, vol. 15, Issue: 11, pp. 1162-1173, AT&T Bell Laboratories, Murray Hill, New Jersey, USA.

Portions of prosecution history of AU 2012200110, May 6, 2013 (mailing date), Apple Inc.

Rigamonti, Maurizio, et al., "Towards a Canonical and Structured Representation of PDF Documents through Reverse Engineering," Proceedings of the Eighth International Conference on Document Analysis and Recognition (ICDAR'05), Aug. 29-Sep. 1, 2005, vol. 2, pp. 1050-1054, Fribourg University, Switzerland.

* cited by examiner

I. Main Header 1
   A. Secondary Header 1
   B. Secondary Header 2
      i. Tertiary Header 1
      ii. Tertiary Header 2
      iii. Tertiary Header 3
   C. Secondary Header 3
II. Main Header 2
   A. Secondary Header 1
   B. Secondary Header 2
      •
      •
      •
III. Main Header 3
   •
   •
   •

*Figure 1*

I. Primary Header

This is the first paragraph. This is the first paragraph. This is the first paragraph. This is the first paragraph. This is the first paragraph. This is the first paragraph.

A. Secondary Header

This is the second paragraph. This is the second paragraph. This is the second paragraph. This is the second paragraph. This is the second paragraph. This is the second paragraph. This is the second paragraph.

*Figure 12*

| | |
|---|---|
| 1 | Main Header 1 |
| 1.1 | Secondary Header 1 |
| 1.2 | Secondary Header 2 |
| 1.2.1 | Tertiary Header 1 |
| 1.2.2 | Tertiary Header 2 |
| 1.2.3 | Tertiary Header 3 |
| 1.3 | Secondary Header 3 |
| 2 | Main Header 2 |

*Figure 13*

RECONSTRUCTION OF LISTS IN A DOCUMENT

CLAIM OF BENEFIT TO PRIOR APPLICATIONS

This application is a divisional application of U.S. patent application Ser. No. 13/106,806, filed May 12, 2011, now issued as U.S. Pat. No. 8,380,753. U.S. patent application Ser. No. 13/106,806 claims the benefit of U.S. Provisional Application 61/433,951, entitled "Reconstruction of Lists, Ordering Page Content, Storing Multiple Representations for a Document, and Adaptive Graphic Objects", filed Jan. 18, 2011, and U.S. Provisional Application 61/433,959, entitled "Reconstruction of Lists in a Document", filed Jan. 18, 2011. U.S. Provisional Application 61/433,951, U.S. Provisional Application 61/433,959, and U.S. patent application Ser. No. 13/106,806, now issued as U.S. Pat. No. 8,380,753 are incorporated herein by reference.

BACKGROUND

Authors of electronic documents often create lists and other sequential or grouped content structures (e.g., numbered chapters, sections, footnotes, bibliographic entries, etc.) without using a list-editing tool or otherwise specifying the list as a semantic structure in the document. In addition, even if the author encodes this structure in the document, the structure may be lost when printing to a PDF through a virtual printer driver.

When the list information is not explicit in the structure of the document, this prevents various applications from using features that take advantage of such lists. Applications are unable to suggest additional list entries for a user, cannot navigate a document as easily, or copy portions of a list as accurately.

BRIEF SUMMARY

Some embodiments of the invention provide a novel method for reconstructing a set of lists for a document in which the lists are not explicitly encoded. In some embodiments, the document includes one or more columns, and a set of lists are reconstructed separately for each column. To reconstruct a list within a column, some embodiments use a combination of geometric analysis (e.g., horizontal indentations of text lines) and lexical analysis (e.g., identifying types of lists based on the characters in the list labels).

For each column, the method of some embodiments initially performs a combination of geometric and lexical analysis to identify list spacing within the column. The method determines, based on collections of aligned indentation gaps with appropriate statistical properties, potential spacers between list labels and list content. These list spacers can be confirmed by using lexical analysis to search for particular criteria indicative of a list item. In some embodiments, the method then determines a level for each list item within the column based on the different identified list spacers.

Using this information, the method reconstructs the lists within the column. The method uses the list levels and spacers to identify list items that are likely part of a single list, and confirms these matches by categorizing the lists based on list templates and determining whether the list items fit together in a single list. Once the lists in a column are reconstructed, some embodiments identify matching lists between subsequent columns to reconstruct lists across an entire document. The columns may be on the same page as well as multiple pages.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 1 illustrates an example of a column that includes various lists.

FIG. 12 illustrates an example of a portion of lists with paragraph content in between nested list headers.

FIG. 13 illustrates an example of a set of nested lists.

DETAILED DESCRIPTION

Figure 2:
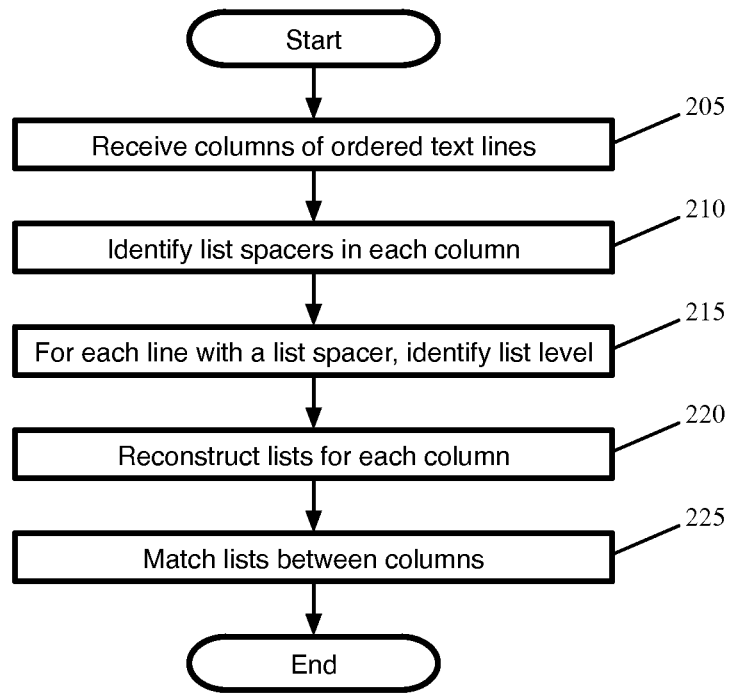
FIG. 2 conceptually illustrates a process of some embodiments for reconstructing a list that spans one or more columns of text.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a novel method for reconstructing a set of lists for a document in which the lists are not explicitly encoded. In some embodiments, the document includes one or more columns, and a set of lists are reconstructed separately for each column. To reconstruct a list within a column, some embodiments use a combination of geometric analysis (e.g., horizontal indentations of text lines) and lexical analysis (e.g., identifying types of lists based on the characters in the list labels).

For each column, the method of some embodiments initially performs a combination of geometric and lexical analysis to identify list spacing within the column. The method determines, based on collections of aligned indentation gaps with appropriate statistical properties, potential spacers between list labels and list content. These list spacers can be confirmed by using lexical analysis to search for particular criteria indicative of a list item. In some embodiments, the method then determines a level for each list item within the column based on the different identified list spacers.

Using this information, the method reconstructs the lists within the column. The method uses the list levels and spacers to identify list items that are likely part of a single list, and confirms these matches by categorizing the lists based on list templates and determining whether the list items fit together in a single list. Once the lists in a column are reconstructed, some embodiments identify matching lists between subsequent columns to reconstruct lists across an entire document. The columns may be on the same page as well as multiple pages.

FIG. 1 illustrates an example of a column 100 that includes various lists. As is apparent to the human eye, the column includes a main list with labels "I", "II", and "III", as well as various lists nested inside this list. However, if the list structure is not encoded in the document containing column 100, then applications using the document will not be able to use this list structure. The method of some embodiments uses the combination of geometric analysis (e.g., identifying the different levels of indentation of the list items in the column 100) and lexical analysis (e.g., identifying the sequence of "I", "II", "III", etc.) to reconstruct these lists and explicitly encode the lists in a model of the document.

Several more detailed embodiments of the invention are described below. Section I describes an overall flow of the process for reconstructing lists in a document. Section II then describes a detailed process for identifying and reconstructing lists within a column. Section III describes a detailed process for matching lists across a set of columns. Section IV describes the software architecture of a module of some embodiments for reconstructing lists. Finally, Section V describes an electronic system with which some embodiments of the invention are implemented.

I. Overall Flow of List Reconstruction

As mentioned, some embodiments identify and reconstruct lists in an electronic document in which the lists are not explicitly encoded as a semantic structure. Such lists may be numbered chapters, sections, footnotes, bibliographic entries, photos, days of the week, lines of code, table of contents entries, bulleted outlines, etc. These lists may not be explicitly encoded because the lists were created by a word-processing application without a list creation tool (e.g., a simple text editor) or a graphics-oriented program using separate text boxes or layout areas for each entry in the list, as examples. In some cases, a document may have been created with an explicit list, but that semantic structure may have been lost in a format conversion (e.g., if the document is saved to a PDF file through a virtual printer driver.

Detecting such implicit lists in a document and converting the implicit lists into an explicitly encoded list enables an application that uses the document to provide the benefits of such an encoded structure. For example, editing software can suggest an automatically-generated next list item and label with proper formatting. Hyperlinks, linked tables of contents, and other such electronically-encoded references to sequential items can be automatically generated and can move with the object that they reference as a user edits the document. Document viewing applications may enable a user to search and navigate a document using a chapter number or other such list item. For inter-application communication, reconstructing a list can enable a user to copy an implicit list from a document viewer and paste the list into a document editor as an explicit list to facilitate further editing. In addition, list reconstruction can be used as part of the general semantic reconstruction needed to fully import a vector graphics document (e.g., a PDF file) into a document editing application. This general semantic reconstruction is described in detail in U.S. patent application Ser. No. 12/455,866, published as United States Publication No. 2010/0174985, which is incorporated herein by reference.

In some embodiments, the list reconstruction process uses a combination of geometric and lexical approaches to identify implicit lists and convert them into explicit lists. That is, the process accounts for both the placement and appearance of the content (e.g., indentation) as well as the specific characters used to form labels in the list (e.g., Roman numerals).

FIG. 2 conceptually illustrates a process 200 of some embodiments for reconstructing a list that spans one or more columns of text. The process 200 will be described by reference to FIGS. 3-6, which illustrate various aspects of the list reconstruction process. As shown, the process 200 begins by receiving (at 205) one or more columns of ordered text lines. As will be described, some embodiments initially evaluate each column of text separately, then match up the lists between sequential columns. For a multi-page document, some embodiments treat each page as a separate column for the list reconstruction process even when the pages are single-column pages.

In some embodiments, the ordering of text lines and columns is explicitly encoded into the document, even if the lists are not. In other embodiments, the text lines and columns are semantically reconstructed as well. Methods for such reconstruction are described in detail in US 2010/0174985, incorporated by reference above.

Figure 3:
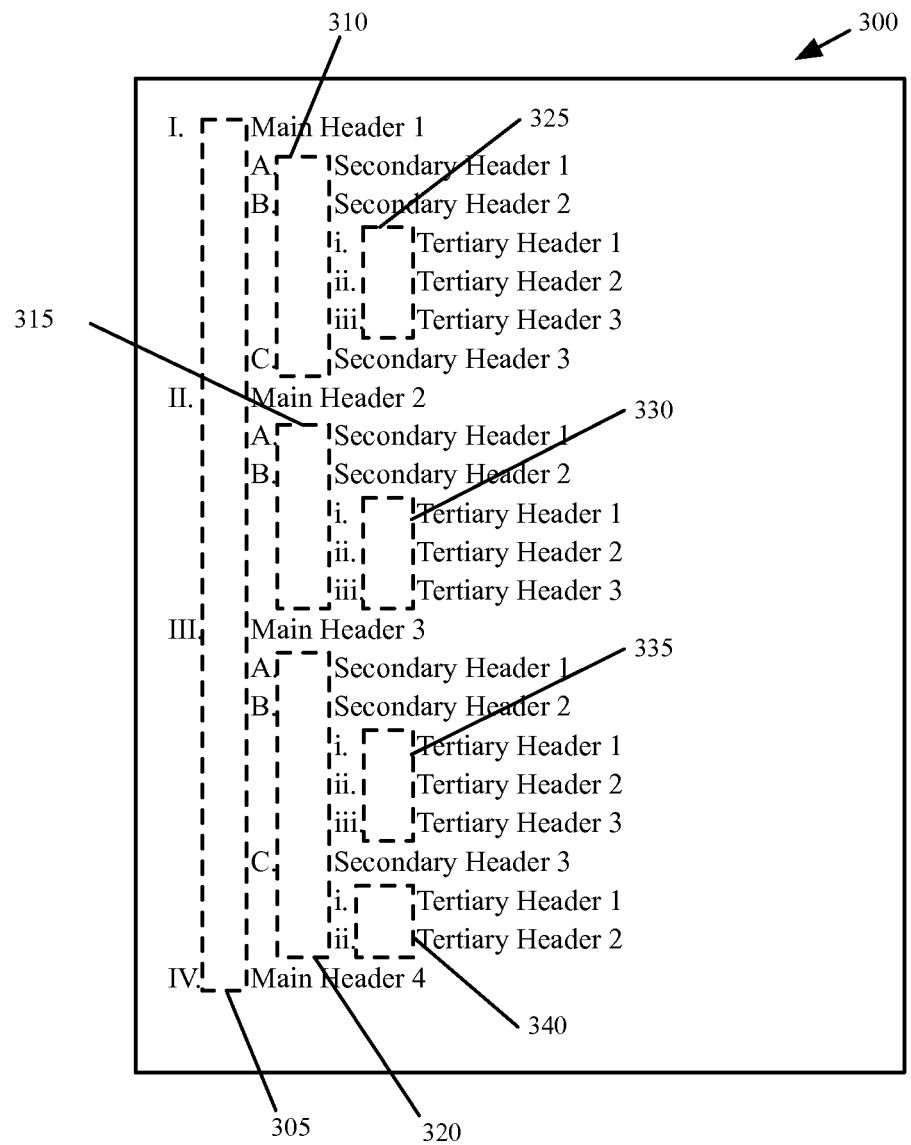
FIG. 3 illustrates a single column of twenty-three ordered text lines that appear to the human eye as clearly belonging to a list.

FIG. 3 illustrates a single column 300 of twenty-three ordered text lines that appear to the human eye as clearly belonging to a list. However, without any explicit encoding, an electronic application would not be aware of the list structure. As can be seen, the list structure includes three levels of lists. In some embodiments, the line breaks are encoded in the structure of the document, whereas other embodiments use a document reconstruction process to identify the words and lines and identify that the lines are all a single column.

Next, the process 200 identifies (at 210) list spacers in each of the columns. As mentioned, some embodiments reconstruct lists in each column separately. One of ordinary skill in the art will recognize that this may involve looping through operations 210-220 for each of the columns in some embodiments, rather than the process 200 shown in this figure.

In some embodiments, a list spacer is an identified gap in a text line that meets particular criteria indicating that the gap is a likely candidate to be a separator between a list label (e.g., "I." in the first line of column 300) and list content (e.g., "Main Header 1" in the same line). A list spacer is a specific type of spacer, which some embodiments define as a vertical strip, extended as far as possible, with no page content.

To identify list spacers in a column, some embodiments identify split gaps in the text lines of the column and then find vertical assemblies of these split gaps. In summary, with the text lines sorted by the y-coordinate of their baseline, the process starts at the bottom of the page. From the bottom of the page, the process assembles together potential split gaps with overlapping x-intervals from successive text lines. This generates a vertical rectangular strip that passes completely through the gaps of each assembled collection of potential split gaps. That is, the thickness of the vertical strip spans the intersection of all of the x-intervals assembled in the collection. A strip is extended vertically as long as possible, until the strip comes across a text line that has no potential split gap overlapping it. If the vertical assemblies of the split gaps fit specific criteria indicative of list items, then the assembly of gaps is identified as a list spacer. The discussion below of FIG. 7 describes in detail the process for identifying list spacers.

Figure 4:
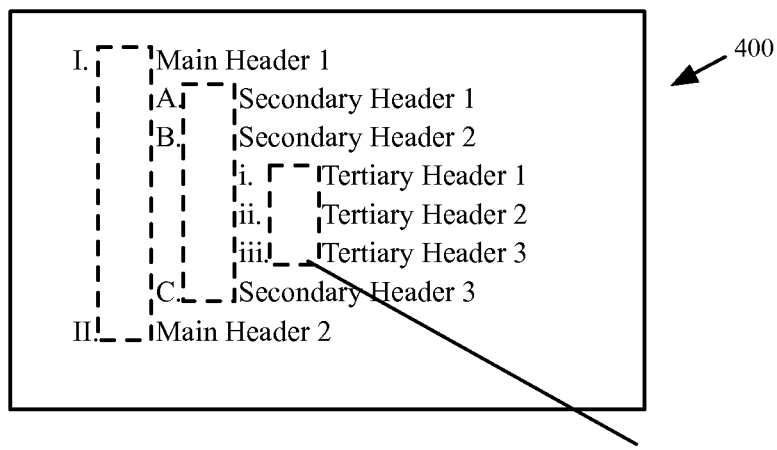
FIG. 4 illustrates the identified list item start candidates for a column, which also happens to be the first eight lines of the column.

FIG. 4 illustrates the identified list item start candidates for a column 400, which also happens to be the first eight lines of the column 300. In this case, because all of the text lines are in fact list items, all lines have associated list spacers, as shown. Each of the eight lines has a potential split gap between the first and second words of the line (the first words being, e.g., "I.", "A.", "B.", "i.", etc.), with the second words being aligned to the left. These split gaps are assembled into the three list spacers illustrated in the figure.

Figure 5:
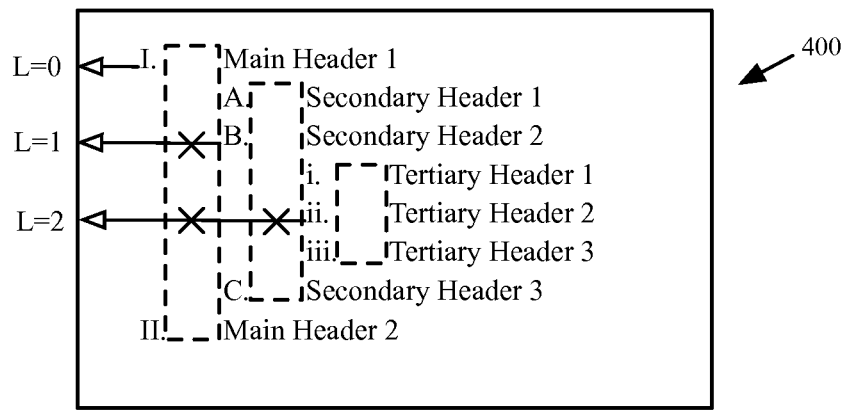
FIG. 5 illustrates the list level calculation of some embodiments for the column from FIG. 4.

Returning to FIG. 2, the process 200 identifies (at 215) a list level for each line with a list spacer. The list level of a line is used to determine the line's relative indentation in the column. FIG. 5 illustrates the list level calculation of some embodiments for the column 400 from FIG. 4. As shown, some embodiments extend the baseline of any line with a list spacer from the left edge of the baseline to the left edge of the column. The process counts the number of list spacers belonging to text lines in the same column that the extended baseline intersects. As shown, this number is zero for the first line of the column (i.e., the extended baseline intersects no list spacers. For the third line (and the second and seventh lines as well), this count is one, while the fifth line (and fourth and sixth line) intersects two list spacers. These counts are associated with their respective text lines as the list level of the text line. Some embodiments start the numbering from one rather than zero.

The process then reconstructs (220) the lists for each column. The list reconstruction process is described in detail below in Section II by reference to FIGS. 8A-8B and 9. In general, the process creates a stack of pending lists and uses various rules to create new lists in the stack, add items to a list, and close out lists and remove them from the stack. The list reconstruction process of some embodiments uses a label template identification function, label lexer functions, and label generation functions.

The label template identification function of some embodiments identifies the alphabet, or template, used for a particular list, choosing from a set of supported alphabets. Examples of such alphabets include Decimal {0, 1, 2, . . . , 9}, Lower Roman {i, v, x, l, c, d, m}, Upper Roman {I, V, X, L, C, D, M}, Lower Latin {a, b, c, . . . , z}, Upper Latin {A, B, C, . . . , Z}, Lower Greek {α, β, γ, . . . , ω}, Upper Greek {A, B, Γ, . . . , Ω}, Disc Bullet {•}, Circle Bullet {○}, Dash Bullet {-}, Asterisk Bullet {*}, etc.

The label template for a particular list entry consists of a prefix string, a suffix string, and a type of bullet or ordinal (for which the alphabets are used). The label template for a particular label is identified by starting at the last character of the label (which can be identified as the first character to the left of the list spacer for a particular list item) and moving backwards until reaching a character that matches one of the supported alphabets. Once such a character is found, this defines the list type and alphabet. If the character is in multiple alphabets (e.g., "i", "D", etc.), multiple templates can be chosen and the choice between them resolved at a later stage of the list reconstruction.

Figure 6:
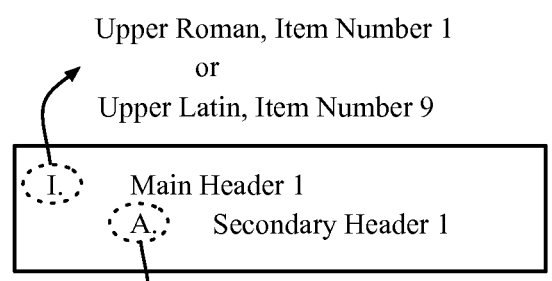
FIG. 6 illustrates the possible label templates for the first two lines of column of FIG. 4.

The process continues to check previous characters as long as they are from one of the matching alphabets. This range of characters defines the range of the ordinal or bullet for the label in some embodiments. All characters in the label prior to the ordinal range define the prefix, and all characters in the label after the ordinal range define the suffix. Thus, as shown in FIG. 6, the label template for the first line of column 400 is an empty prefix, either Upper Roman or Upper Latin, and a suffix of ".". In this case, the Upper Roman template is prioritized over the Upper Latin because the character "I" is more likely to belong to the Upper Roman alphabet, especially at the top of a column. However, if the next list item at this level was "J", then the Upper Latin alphabet would be selected at that point.

Some embodiments restrict the properties of the prefix and/or suffix as well. Such properties might include the string length, character set, or regular expressions. For instance, the suffix could be limited to a single character in length, or limited to a few specific values (e.g., ".", ")", ":", etc.). Prefixes and suffixes may be disallowed completely for specific types (e.g., bulleted lists) in some embodiments.

In addition to the prefix and suffix definitions and the ordinal type, some embodiments include font and style information in the label template. For instance, the template for the list whose first entry is the first line in column 300 might indicate empty prefix, Upper Roman ordinal, suffix of ".", with regular (i.e., non-bold, non-italic, non-underlined) Times New Roman font.

The label lexer function for a particular list type generates an item number for a list label using the bullet or ordinal portion of the label as an input. For instance, both of the lines shown in FIG. 6 have an item number of 1, while the third line shown in FIG. 5 has an item number of 2. In some embodiments, all bulleted or other unordered list types always generate an item number of 1. For common ordered list types (e.g., Lower Roman, Upper Roman, etc.), some embodiments implement the label lexer as a deterministic finite automaton (DFA) using well-known techniques. For the simplest cases (e.g., Decimal, Lower Latin, Upper Latin), some embodiments implement the label lexer using arithmetic on character codes.

The label generator function is essentially the reverse of the label lexer function. The label generator generates a label for a given label template and item number. For instance, for the label template associated with the first line shown in FIG. 6, the label generator would generate "IV." if given the item number 4. Some embodiments generate the same result regardless of input for a bulleted list. For the ordinal portion of ordered lists, the generator of some embodiments will normally use integer division by powers of a base (e.g., base 10 for Decimal and Roman, base 26 for Latin, etc.) in order to determine the digits of the number in that base, then concatenate the string descriptions of each digit in order.

Returning to FIG. 2, the process 200 next matches (at 225) lists between columns. The list matching process is described in detail in Section III below by reference to FIGS. 10 and 12. With lists reconstructed for each column, the process of some embodiments identifies open lists at the end of a first column and attempts to match these lists to open lists at the start of the next column in order to combine the lists.

Figure 7:
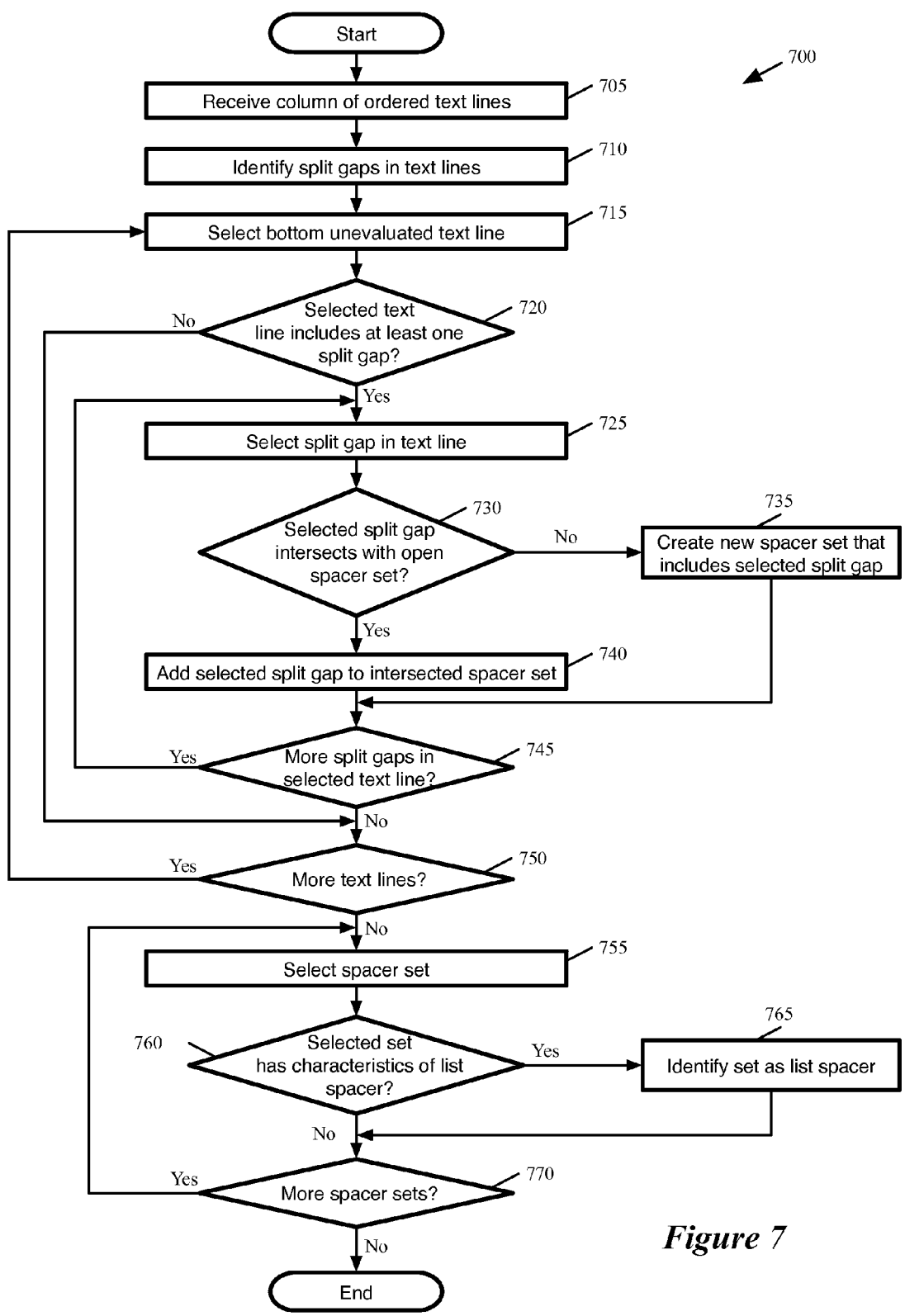
FIG. 7 conceptually illustrates a process of some embodiments for identifying list spacers within a column of text lines.

As mentioned above, a number of operations are performed in order to identify list spacers within a column of text lines. FIG. 7 conceptually illustrates a process 700 of some embodiments for identifying list spacers within a column of text lines. As shown, the process 700 begins by receiving (at 705) a column of ordered text lines. As described above by reference to FIG. 2, some embodiments evaluate each of several columns in a document separately. In such embodiments, list spacers are identified separately for each column.

The process next identifies (at 710) split gaps (or potential split gaps) in the text lines of the column. Split gaps are gaps between words or similar content that are larger than the expected gaps between two subsequent words in a sentence. In some formats (e.g., a rich word-processing format), the split gaps can be identified based on the spacing characters used in the document (e.g., tab characters, sequences of multiple space characters in a row, explicit padding or margins that separate columns, floating images, and other document content structures, etc.). For vector graphics documents (or other documents where the only information given is coordinates of glyphs), some embodiments identify split gaps as part of the semantic reconstruction process described in detail in US 2010/0174985, incorporated by reference above. Some such embodiments perform cluster analysis to determine average spacing between glyphs within a word and average spacing between words, and then classify gaps larger than the average inter-word spacing as a split gap or potential split gap.

Once split gaps are identified, some embodiments create spacers from these gaps using a process such as that described in detail in US 2010/0174985. In summary, the process assembles vertical collections of split gaps into spacers. The process 700 selects (at 715) the bottom-most unevaluated text line of the column. The first time through operation 715, this will be the bottom-most text line in the column. Each time through the operation, the process will select the next text line up.

The process then determines (at 720) whether the selected text line includes at least one split gap. When the text line does not include any split gaps, then the process proceeds to 750 to determine whether any text lines remain in the column. In this case, the column will not include any list spacers that go through the text line. On the other hand, when the selected line includes at least one split gap, the process selects (at 725) a split gap from the text line. Different embodiments select split gaps from left to right, right to left, or in a random order.

Next, the process determines whether the selected split gap intersects (at 730) with an open spacer set. As described in the following paragraphs, some embodiments create spacer sets of split gaps that at least partially line up horizontally in subsequent text lines. For example, in column 400 of FIG. 4, the gap between "ii." and "Tertiary Header 2" in the fifth text line lines up with the gap between "iii." and "Tertiary Header 3" in the sixth text line. Some embodiments also determine whether the selected split gap intersects a spacer set that includes any of the previous lines and without intervening text in the lines between the split gaps. For example, the gap between "I." and "Main Header 1" in the first line of column 400 lines up with the gap between "II." and "Main Header 2" in the eighth line, and some embodiments would align these split gaps because there is no intervening text in the second through seventh lines.

When the selected split gap does not intersect with an open spacer set (i.e., a spacer set that includes the previous line or is not blocked by text in the previous line), the process creates (at 735) a new spacer set that includes the selected split gap. For example, in column 400, the process would initially create a spacer set for the split gap in the eighth line, then when evaluating the seventh line would have to create a new spacer set for the split gap between "C." and "Secondary Header 3", as it does not intersect with the already-created spacer set.

On the other hand, when the selected split gap intersects with an open spacer set, the process adds (at 740) the selected split gap to the intersected spacer set. Some embodiments use the intersection of the split gaps to determine the boundaries of the vertical strip defined by the spacer set. For example, the fourth, fifth, and sixth lines of column 400 each have a split gap and these split gaps line up to form spacer 405. The spacer 405 is only as wide as the narrowest of these three gaps, because the width of the spacer is defined by the intersection along the horizontal axis of the gaps.

FIG. 3 illustrates the spacers generated for column 300. As shown, some embodiments do not count a space prior to the beginning of a text line as a split gap, but also do not prevent the assembly of a spacer through such a space. For instance, spacer 305 is an assembly of four split gaps that are each separated by five to eight text lines. In addition, there are three spacers 310-320 that are prevented from connecting with each other by the main headers of the outline, and four spacers 325-340 that are prevented from connecting by the main headers and secondary headers. Because these spacers all have left-aligned text on their right side, the width of these spacers are determined based on the right edge of the left boundary text (i.e., the list item numbers).

Returning to process 700, the process next determines (at 745) whether additional split gaps remain in the text line. If additional gaps remain, the process returns to 725 to select the next gap. When all the gaps have been evaluated for the currently selected text line, the process determines (at 750) whether any text lines remain. If additional text lines need to be evaluated (i.e., the currently selected text line is not the topmost line in the column), the process returns to 715 to select the bottom unevaluated text line. After evaluating all of the gaps in the column (all of the gaps in all of the text lines), the process proceeds to 755 to determine whether the assembled spacers are list spacers.

The process 700 selects (at 755) a spacer set (i.e., one of the sets constructed out of the split gaps at operations 715-750). The process may select spacer sets from left to right, top to bottom, etc., or a combination thereof.

The process then determines (at 760) whether the selected spacer set has the characteristics of a list spacer. While constructing the spacers for a column, some embodiments collect statistics on all of the spacers found in the column. Using these statistics, some embodiments identify list spacers as spacers that meet particular criteria. The criteria are indicative that the spacer is likely a gap between a list label and list content, as compared to spacers indicating a split in the text line (e.g., indicating that a column should be split in two). An example of such criteria is a requirement that the words to the right of list spacers are aligned on the left, while there tend to be zero or one words between a list spacer and the spacer (or margin) to its left (this one word being a list label).

Once the list spacers are identified, some embodiments examine the potential split gaps through which the list spacers pass. For instance, in the case of spacer 305 of FIG. 3, there are only four split gaps, although the spacer has a vertical length of 23 lines. When a list spacer passes between the first and second words of a text line (after any text line splitting has been performed), the text line is flagged as a potential list item start candidate and the associated list spacer is assigned to the line. Some embodiments may keep spacers as list spacers when the spacer meets all the criteria for a list spacer, even if the spacer would otherwise be discarded for being too thin.

When the selected spacer meets the characteristics of a list spacer, the process 700 identifies (at 765) the set as a list spacer. In some embodiments, the list spacers are stored in memory for use in a larger document reconstruction process. Some embodiments store the list spacers as information in a file that describes the document (e.g., storing the spacers themselves as document objects). The process then determines (at 770) whether any additional spacer sets remain for evaluation. If more spacer sets remain, the process returns to 755 to select the next spacer. When all of the spacer sets are evaluated, the process ends.

II. Reconstructing Lists in a Column

Figure 8A:
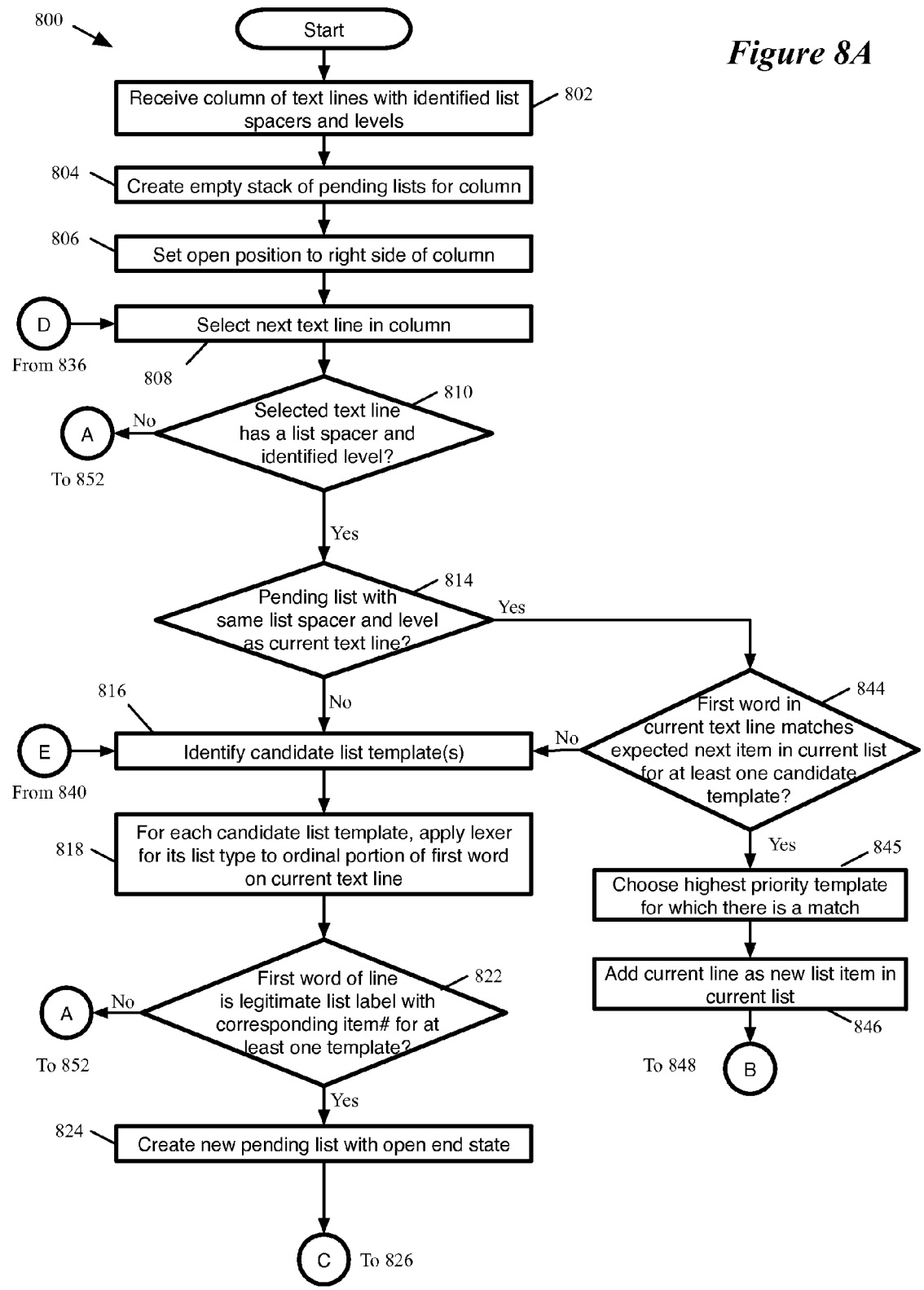
FIGS. 8A-8B conceptually illustrate a process of some embodiments for reconstructing lists within a single column.
Figure 8B:
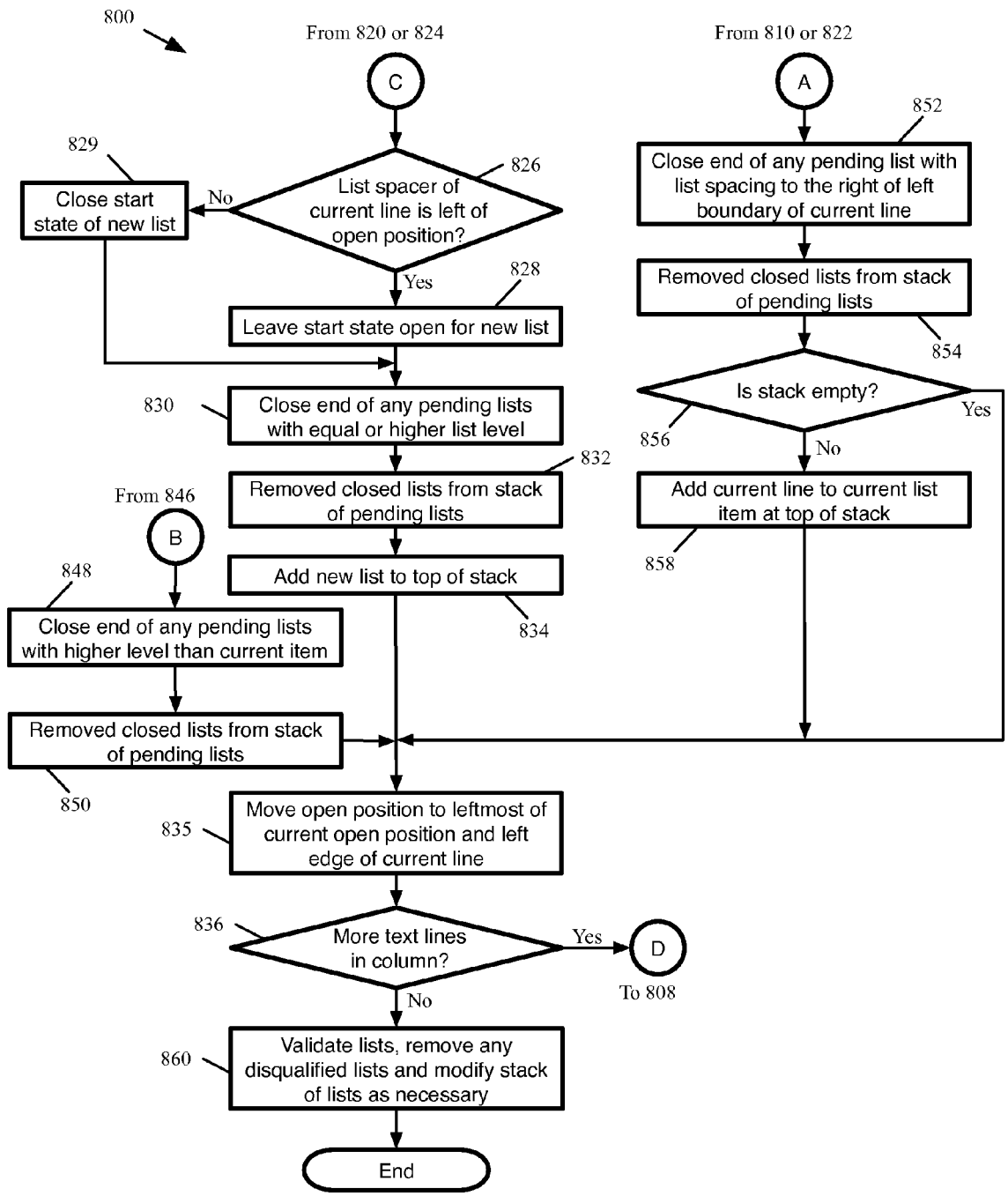

As mentioned above, some embodiments reconstruct lists one column at a time by using a stack of pending lists. FIGS. 8A-8B conceptually illustrate a process 800 of some embodiments for reconstructing lists within a single column. The process 800 will be described by reference to FIG. 4, which illustrates a column 400 having eight lines, and FIG. 9, which conceptually illustrates a stack 900 of pending lists over eleven stages 905-955.

As shown, the process 800 begins by receiving (at 802) a column of text lines with identified list spacers and levels. In some embodiments, the list spacers and levels are identified as described above in Section I (i.e., by using potential split gaps to find spacers, determining the spacers that are list spacers, and finding a level for each spacer.

Figure 9:
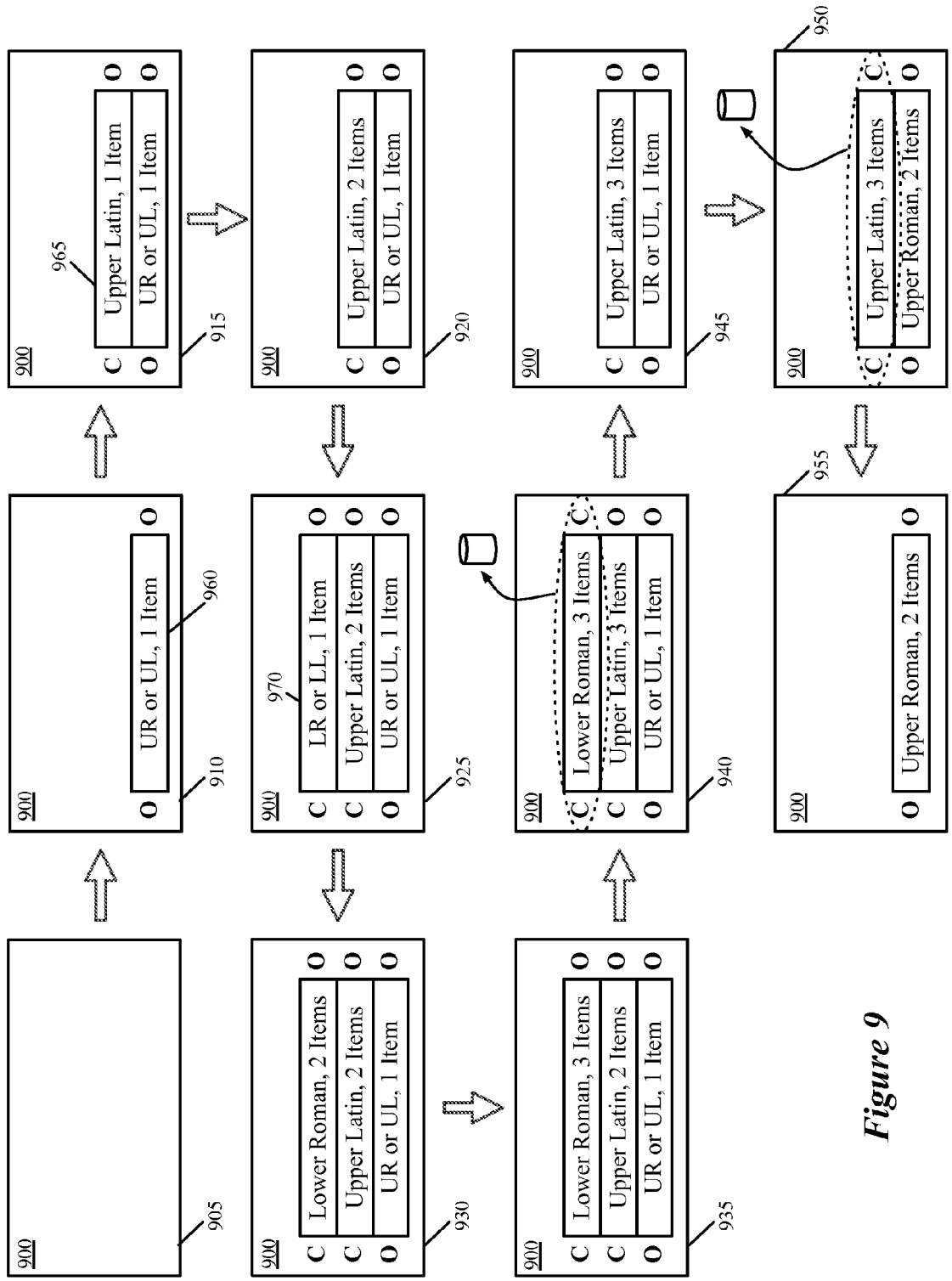
FIG. 9 conceptually illustrates a stack of pending lists over eleven stages.

Next, the process creates (at 804) an empty stack of pending lists for the column. As mentioned, FIG. 9 illustrates a stack 900, which at the first stage 905 is empty (i.e., there are no pending lists in the stack). The process also sets (at 806) the open position at the right edge of the column. As will be described later in the process 800, the open position is used to determine whether the start of a new list can be left open or should be closed.

The process then selects (at 808) the next text line in the column. The process of some embodiments begins at the topmost text line in the column. Referencing column 400, this is the line starting with "I.". Some embodiments only process the lines that have list spacers, ignoring all other lines (i.e., lines with content between the lists), while other embodiments process all of the text lines in a column.

The process 800 next determines (at 810) whether the selected text line has a list spacer and identified level. As mentioned, some embodiments only process text lines with list spacers and identified levels, whereas other embodiments process all text lines. The process 800 examines all of the text lines, and when the selected text line does not have a list spacer and identified level, the process proceeds to 852, which is described in detail below.

When the selected text line has a list spacer and an identified level, the process determines (at 814) whether a pending list is in the stack that has the same list spacer and level as the current line. When this is the case, the current line may belong to that pending list. The first time through operation 814, of course, there are no pending lists, either with the same or different list spacers and levels. When a list is pending in the stack with the same spacer and level as the currently selected text line, the process proceeds to 844, described below.

On the other hand, when no lists are pending in the stack with the same spacer and level as the currently selected text line, the process identifies (at 816) any candidate list templates for the current list. As described in the previous section, some embodiments begin from the list spacer and work backwards to try to identify the alphabet used for the list to which the current line belongs. Some embodiments may identify multiple candidate list templates and leave open a template decision when a first list item is ambiguous because it has characters that could be in multiple different alphabets (e.g., "I", "i", etc.).

The process then applies (at 818), for each candidate list template just identified, the lexer for its list type to the ordinal portion of the first word of the current text line. At this point, from identifying the candidate list templates, the process has determined the prefix, suffix, and ordinal portion of the first word (the label) of the text line.

The process determines (at #722) whether the first word of the text line is a legitimate list label with a corresponding item number for at least one of the candidate templates. Using the lexer function (at 818), if a successful output (that need not match up as item number one of the alphabet) is reached, then the first word of the current line is a legitimate list label of the item. For example, the label "i." could resolve to two legitimate alphabets (Lower Roman and Lower Latin).

When there are no templates for which the word is a match, then the line is not a list item (at least not in an alphabet recognized by the application performing the list reconstruction), and the process proceeds to 852, described below. However, when the first word has at least one match, the process creates (at 824) a new pending list with an open end state. A list has an open end state when it is possible to continue adding items to the end of the list. On the other hand, once it is no longer possible to add items to the end of the list, the list will have a closed end state. In some embodiments, lists are always added to the stack with an open end state.

When the list label could be from more than one alphabet, the new pending list will not have a definite template, but instead any candidate templates that matched (at operation 822) will be stored for the list. When a second list item is added to the list, the process will resolve this template decision by choosing one of the matched templates.

The second stage 910 of FIG. 9 illustrates that a first list 960 has been added to the stack 900. As shown, the list 960 currently has only one item, corresponding to the first line in column 400. As the list label for this line is "I.", this could be either Upper Roman with item number one or Upper Latin with item number nine. Thus, the list is added to the stack, storing two possible templates. As shown, Upper Roman is listed first because it is the higher priority of the two possible alphabets. In general, when the first ordinal found in the list is "I" or "i" the corresponding Roman numeral alphabet is the more likely alphabet, though of course the possibility remains that the item is a continuation of a Latin alphabet list from a previous column.

The process 800 then determines (at 826) whether the list spacer of the current line is left of the open position. As indicated above, some embodiments use the open position to determine whether the start state of a new list should be left open. A start state of a list is left open when there is a possibility that the list could be a continuation of a list from a previous column, page, section, etc. Thus, when the list is not nested inside a previous list of the current column, the start state will be left open. The open position is used to keep track of the leftmost list in the column, and any lists with spacers to the right of this position will have a closed start state.

Thus, when the list spacer of the current line is left of the open position, the process opens (at 828) the start state of the new list. Otherwise, when the list spacer of the current line is at or to the right of the open position, the process closes (at 829) the start state of the new list. If the list spacer for the current line is to the right of the open position, then the column already has a list with items to the left of the current list spacer. As such, the current spacer will have to be the first item in a new list rather than a continuation from a previous column, as it is nested inside at least one other list. As shown at stage 910 of FIG. 9, when the first list 960 is added to the stack, the start state is left open.

Next, the process 800 closes (at 830) the end of any pending lists with equal or higher list level than the list of which the current text line is an item. The process also removes (at 832) the closed lists from the stack of pending lists and adds (at 834) the new list to the top of the stack. Thus, when a new list is added that is at a lower level (i.e., has its list spacer further to the left) than at least one of the lists already on the stack, those lists are closed (at the end state) and removed from the stack. This case could happen in a column that includes a continuation of a previous list. For instance, if a level three list item is the first item in a column, and then a level one list item follows, the creation of the level one list would indicate the end of the level three list. In stage 910 of FIG. 9, the new list 960 is added to the top of the stack, although no lists were in the stack for the process to close and remove.

Next, the process 800 moves (at 835) the open position to the leftmost of the current open position and the left bounds of the current text line. As the process performs this operation after processing each text line in the column, the open position will always be the leftmost bound of any processed text line. Some embodiments, however, only modify the open position after text lines that are part of a list, preventing non-indented non-list text from affecting the open position (e.g., body text in between chapter headings).

The process then determines (at 836) whether any more text lines remain in the column. Once all of the text lines have been examined, the process 800 proceeds to 860, which will be described below. When additional text lines remain, the process returns to 808 to select the next text line and examine this new line for its list properties. As mentioned above, the process of some embodiments begins at the top of the column and moves downward.

As described above, when the process determines (at 814) that the stack includes a pending list with the same list spacer and level as the current text line, the process proceeds to 844. Here, the process determines (at 844) whether the first word in the current text line matches the expected next item in the list for at least one candidate template. This is a determination as to whether the current line can join the pending list. To determine whether the current line can join the pending list, some embodiments use the label generation function for each of the possible candidate templates and the next item number in those templates (i.e., if the first item in a list is "I", the label generation functions would output "II" and "J"). When there is no match, the process proceeds to 816 to determine whether the item is the start of a new list.

When the generated label is a match, the process chooses (at 845) the highest priority template for which there is a match. If there is only one candidate template at this point, then this will always choose that candidate template. If the item is the third or greater item in the list, then decisions between any candidate templates will always have been resolved. However, when the current line has the second list item in a list with multiple candidate templates, the process chooses whichever template has the highest priority.

The process 800 then adds (at 846) the current line as a new list item in the currently pending list at its level. In FIG. 9, the third stage 915 illustrates that the second line of column 400 causes the creation of a new list 965. The process creates this new list 965 with a closed start state because the open position is currently located to the left of the start of the second line of column 400. This list is added to the top of the stack. The third line is added to this list at stage 920, as the list 965 now has two items.

After adding a new item to a pending list, the process closes (at 848) the end of any pending lists with a higher level than the current item, then removes (at 850) the closed lists from the stack of pending lists. The process then proceeds to 835 to move the open position (if required) and determine whether any additional text lines remain in the column.

That is, when a new item is added to a list at a particular level, any lists nested inside that list (and thus at higher levels) are closed. Referring to column 400, when the item in the seventh row is added to the level one list (Upper Latin), the process closes the level two list (Lower Roman). FIG. 9 illustrates this at stage 940, as will be described after the three prior stages. At stage 925, the fourth line of column 400 causes the addition of a new list 970, which may use either the Lower Roman or Lower Latin alphabets. This decision is resolved at stage 930 when a second item from the fifth line of column 400 is added to the list 970. This second item in the list, being "ii" rather than "j", indicates that the list uses Lower Roman numerals for its alphabet. The sixth line of column 400 is added as a third item of the list 970 at stage 935.

At stage 940, a third item is added to the second list 965 in the stack 900, corresponding to the seventh line of column 400. As the third list 970 is at a higher level than the second list 965, the process closes the third list 970 and removes the list. As shown, some embodiments store the relevant details about the list (i.e., the text lines that make up the items in the list, the number of items, the labels of the items, the template used, etc.) in a storage (e.g., volatile memory such as RAM, a permanent storage such as a hard disk or flash memory, etc.). Stage 945 illustrates that the stack 900 now only has two pending lists, with list 965 as the top list. At stage 950, a second item is added to the first list 960, corresponding to the eighth line of column 400. This addition causes the process to close the second list 965 and remove this list. Stage 950 illustrates that only the first list 960 is now open in the stack 900.

Returning to FIG. 8, when the current text line cannot be used to form a list (e.g., as determined at operation 810 or 822), the process 800 proceeds to operation 852. At this point, the process closes (at 852) the end of any pending list with a list spacer to the right of the left boundary of the current text line. The process also removes (at 854) the closed lists from the stack of pending lists.

Figure 10:
FIG. 10 illustrates an example of a multi-line list item.
Figure 11:
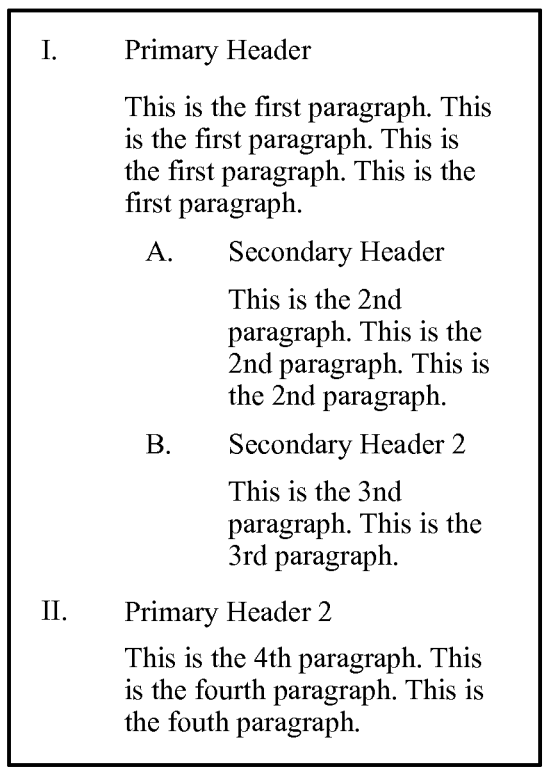
FIG. 11 illustrates a column in which paragraphs between list items are grouped with the list items and do not result in the closures of the lists.

The process then determines (at 856) whether the stack of pending lists is empty after this list removal. When at least one list remains pending in the stack, the process adds (at 858) the current text line to the last list item in the list at the top of the stack. Thus, if a list item spans multiple lines, the additional lines will be grouped with the list item. FIG. 10 illustrates an example of such a multi-line list item 1000. When evaluating the second line of list item 1000, the process would keep a list open with one list item (item "I."), and would then add the second line to that list item because it does not have a list label itself but also does not result in the closure of the list because of its alignment. FIG. 11 illustrates a column 1100 in which paragraphs between list items are grouped with the list items and do not result in the closures of the lists. Each list item of column 1100 has an associated paragraph of three or four lines. These lines are grouped with the list item in some embodiments (e.g., the first paragraph is grouped as part of the list item with label "I.").

Some embodiments, however, do not perform the operations 852 and 854 or perform variations of these operation in order to enable the identification of section or chapter headings in a larger document and the reconstruction of such lists when there is a large amount of non-list content in between the list items. For instance, in some cases section headings will be indented like the lists shown in FIG. 4, but in between these headings will be paragraphs with no indent (i.e., a similar situation to column 1100, without the indented paragraphs). Rather than having each paragraph clear out the stack of pending lists, these paragraphs are added as content under the last list item without closing out any other lists. FIG. 12 illustrates an example of a portion of such lists with paragraph content in between nested list headers. Some embodiments recognize body paragraphs in the document (e.g., based on explicitly encoded formatting or document reconstruction techniques) and eliminate text lines belonging to these paragraphs before performing the list reconstruction process.

Once all of the text lines in a column have been evaluated, the process 800 validates (at 860) the lists, removes any disqualified lists, and modifies the stored stack of lists as necessary. Some embodiments include minimal conditions to recognize a list as legitimate. For instance, some embodiments require a list to have at least two items, preventing the formation of single-item lists. If a list is disqualified, the process removes the list and drops its text lines, as well as any nested lists, to one level lower in the stored stack of lists. If a text line is dropped to the bottom of the stack of lists, then this line is not in any list.

Thus, for example, if the column 400 did not include its eighth line, the first list 960 would be disqualified and removed from the stored stack of lists in some embodiments. The other lists 965 and 970 would each be moved up a level. The first line of the column would not be associated with any list. However, if the document includes multiple columns, then some embodiments will not remove this list, as it may continue in a later column, as described in Section III.

On the other hand, if the fifth and six lines ("ii" and "iii") were not present, then the list 970 would be removed and the fourth text line would be associated with the second item in list 965. In this case, because the single-item list is closed, even in the multiple-column situation the list is eliminated and only two lists are left.

The above process 800 and the described variations use indentation as an indicator of list level. Some embodiments are also capable of identifying nested lists in which the nesting is done using multi-level numbering. FIG. 13 illustrates an example of such a set of nested lists 1300. In this set of nested lists, the list spacer is at the same level for all of the different items, but the list items need to be separated into different lists. To handle this issue, when (i) a current text line is at the same level as a pending list and (ii) the last list item of the pending list (or the last list item plus a separator character) is the prefix portion of the label of the current text line, some embodiments do not close the pending list or remove the list from the stack before adding the new list to the top.

As stated, some embodiments can identify both lists nested by indentation (e.g., those shown in FIG. 3 and lists nested by numbering (e.g., those shown in FIG. 13). To do so, some embodiments use a variation on process 800. At operation 830, some embodiments do not always close pending lists at the same level as the new lists, but instead determine whether multi-level numbering exists between any pending lists at the same level and the new list. Such numbering exists when the condition mentioned above is met—that the last list item of the pending list (or the last list item plus a separator character) is the prefix portion of the label of the current text line.

III. Reconstructing Lists Across Multiple Columns

Figure 14:
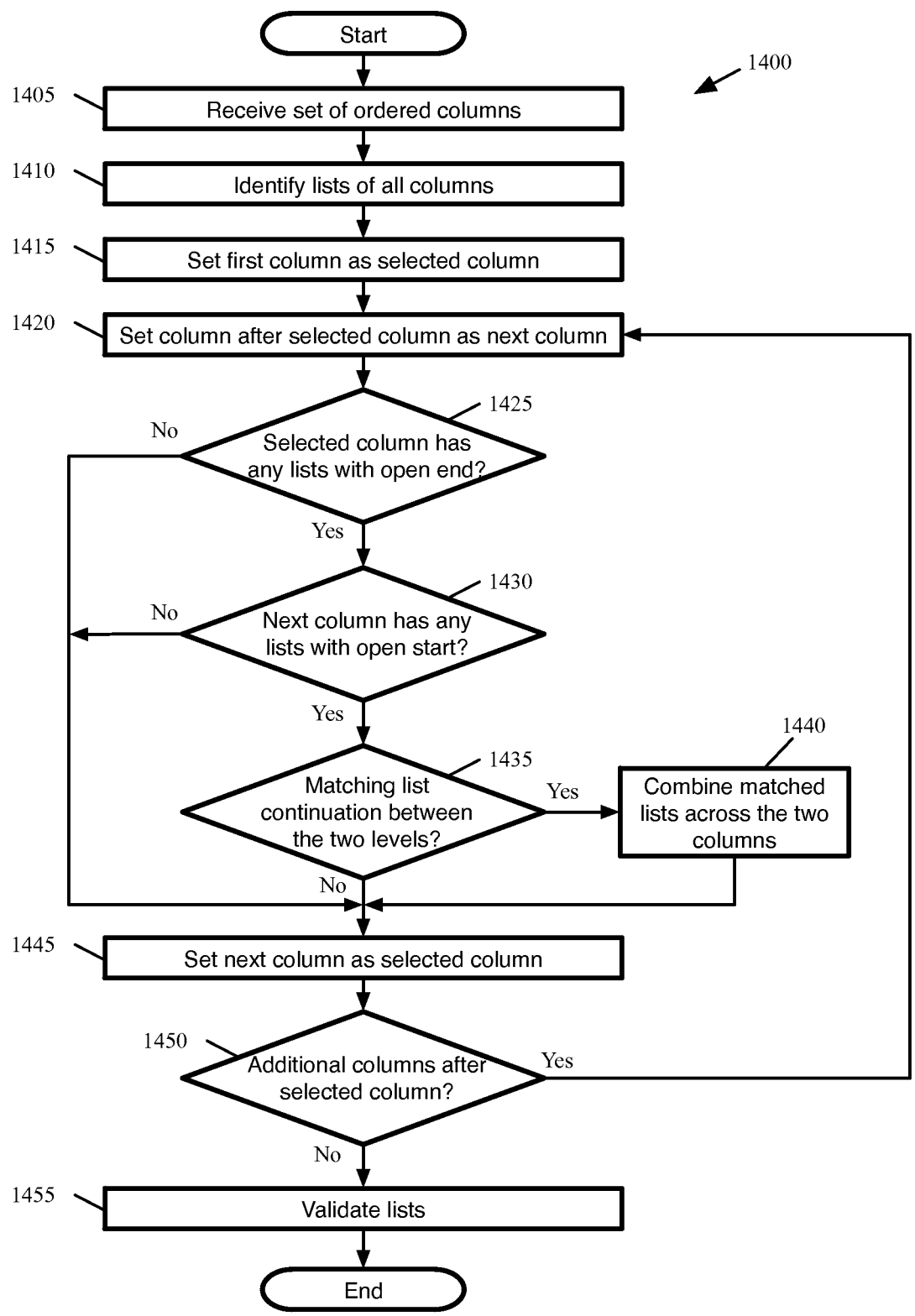
FIG. 14 conceptually illustrates a process of some embodiments for reconstructing lists across multiple columns.

The above section described a process of some embodiments for identifying and reconstructing lists within a single column. As described above, some embodiments perform such a process on each column of a multi-column document, then match open lists across the columns before validating the lists. FIG. 14 conceptually illustrates a process 1400 of some embodiments for reconstructing lists across multiple columns. The process 1400 will be described by reference to FIG. 15, which illustrates a two subsequent columns 1505 and 1510 of a document.

As shown, the process 1400 receives (at 1405) a set of ordered columns. The columns may all be in the same layout of the same page, or may span multiple layouts, pages, sections, etc. In some embodiments, the order of the columns is a given (e.g., is encoded in the structure of the document). In other embodiments, the list reconstruction is part of a larger document reconstruction process, such as that described in US 2010/0174985, which is incorporated by reference above.

The process then identifies (at 1410) the lists of all of the columns. In some embodiments, most of process 800 is performed (excluding the validation operation at 860) in order to identify the lists of the columns. This may leave some of the lists with open start or end states. For instance, in FIG. 15, the first column 1505 will have three lists with open end states (a list of "I", "II", and "III" from lines 1, 8, and 14, a list of "A" and "B" from lines 15 and 16, and a single-item list of "i" from line 17). The first of these lists will also have an open start state. In the second column 1510, two lists will have open start states (a list of "ii" and "iii" from lines 1 and 2 and a list of "C" and "D" from the third and sixth lines). The latter of these two lists will also have an open state.

With all of the lists identified, the process can attempt to match the lists across the columns. The process sets (at 1415) the first column in the order as the currently selected column. The process also sets (at 1420) the column after the selected column as the next column. Some embodiments only perform process 1400 for a document with at least two columns. Other embodiments always perform this process, even for single-column documents, but include an exit condition for the case in which the document only has one column.

Assuming the document has two or more columns, the process determines (at 1425) whether the selected column has any lists with an open end state. If the column has no open lists, then the process proceeds to 1445, described below. If there are no open lists, the process will not try to match any lists from the next column with the current selected column, as a list with an open end from the first of the two columns is a requirement for such a match.

The process then determines (at 1430) whether the next column has any lists with an open start state. Similar to the requirement of an open end state in the first of the pair of columns, the process requires the second column in the pair to have at least one list with an open start state in order to match up with lists of the first column. Again, if there are no lists with open start states, the process does not attempt to match lists across the columns and proceeds to 1445.

If there are lists with open end states in the first column and lists with open start states in the second column, the process determines (at 1435) whether a matching list continuation or set of list continuations exists between the levels. In some embodiments, any open list at the end of a first column can be matched with any open list at the start of the second column so long as the set of all matched list levels are a monotonically increasing function of the original levels and the item labels starting the second column match up as the next item labels for the lists from the first column. That is, the order of the list levels must be maintained throughout the matching, although it is possible for some of the list levels to change while others stay the same.

To determine whether two lists match, some embodiments use the label generation function to generate the next list item of an open end state list from the first column, then check whether this matches the label of the first list item of an open start state list from the second column. After determining whether matches exist for each of the lists in the first column, some embodiments determine whether any required list level changes will violate the monotonicity requirement.

If a valid match (or set of matches) exists between the two columns, the process combines (at 1440) the matched lists across the two columns. In the unlikely case that there is more than one valid match or set of matches between the two columns, some embodiments compare the indentations (e.g., distance from the left edge of the column to the list spacer) to determine which of the valid matches is best (with a preference for lists having the same indent).

The process 1400 then sets (at 1445) the next column as the selected column. Some embodiments also include the previously selected column as part of the next column. Thus, if any open-ended lists in the previously selected column did not find a match and are not closed due to lower-level open-ended lists matching up, the process can search for a match in the next column. In some embodiments, the process concatenates the previously selected column to the next column, thus enabling lists to span across multiple columns (e.g., in case the first list item in a particular list is in the first column and the second item in the list does not appear until the third column).

The process determines (at 1450) whether there are any additional columns after the newly selected column. While additional columns remain, the process returns to 1420 to check for matches with the next column. If no more columns remain, the process validates (at 1455) all of the lists in the set of columns. In some embodiments, this is the same as the operation 860 of process 800, described above. That is, the process validates all of the lists, removes any disqualified lists, and modifies the stored stack of lists as necessary. The process 1400 then ends.

Figure 15:
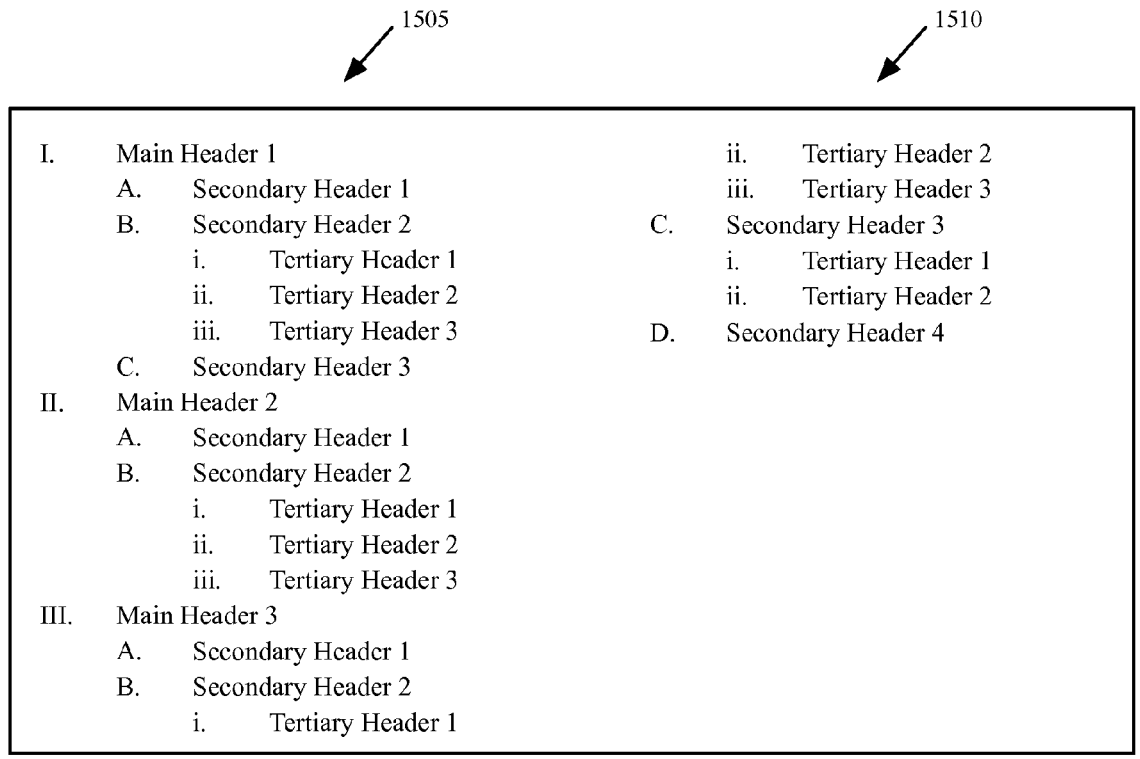
FIG. 15 illustrates a two subsequent columns of a document.

In FIG. 15, the lowest list level of the second column 1510 matches up with the second lowest list level of the first column 1505 (i.e., the "C" list item follows the "B" list item), and the highest list level of the second column 1510 matches up with the highest list level of the first column 1505 (i.e., the "ii" list item follows the "i" list item). The lowest level open list (Upper Roman) of the first column does not have a match in the second column. The process can match these lists easily based on the matching alphabets and the continuing ordinals of the list items.

Figure 16:
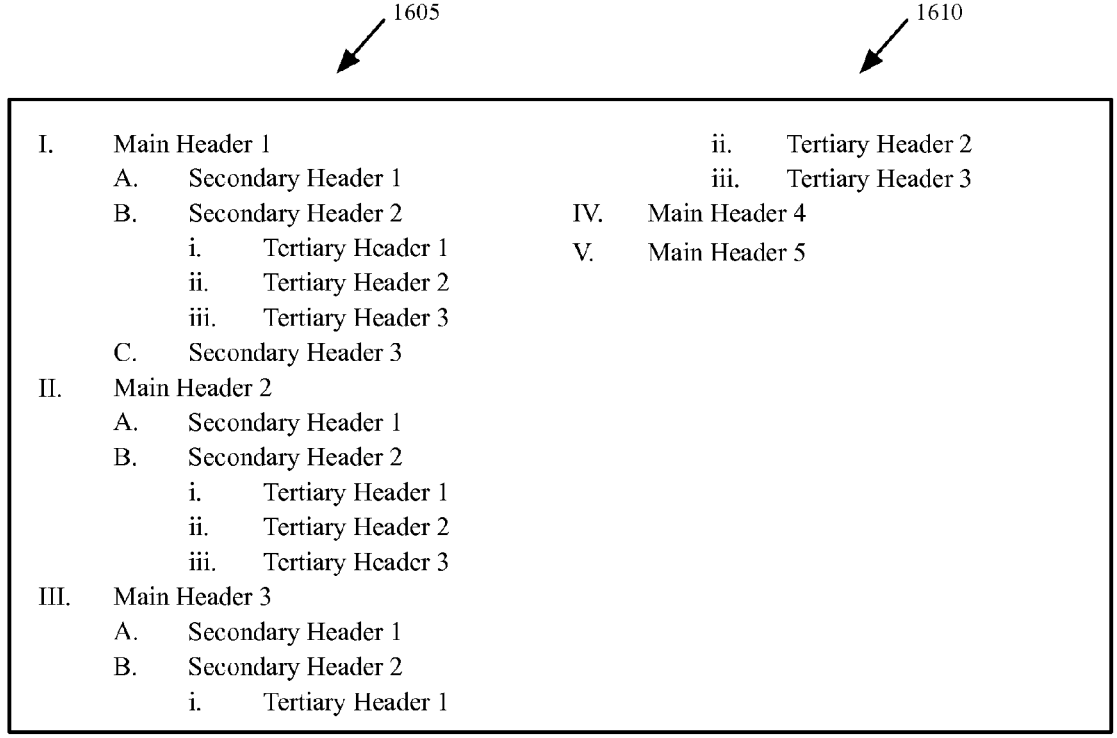
FIG. 16 illustrates an example of two subsequent columns of a document in which when the lists of the columns are combined, one list changes level while a second list stays at the same level, but with the monotonicity requirement preserved.

FIG. 16 illustrates an example in which one list changes level while a second list stays at the same level, but with the monotonicity requirement preserved. In this figure, the second column 1610 has two lists, with level 0 and level 1. The level 0 Upper Roman list matches up with the level 0 Upper Roman list of the first column 1605, but the level 1 Lower Roman list of the second column 1610 matches up with the first column's open level 2 Lower Roman list.

As described above, with the lists fully reconstructed for a document, various features may be enabled. These features may include automatic generation of additional list items, hyperlinks and other references to sequential items, search and navigation functions by list items, copy and paste between formats, etc.

IV. Software Architecture

Figure 17:
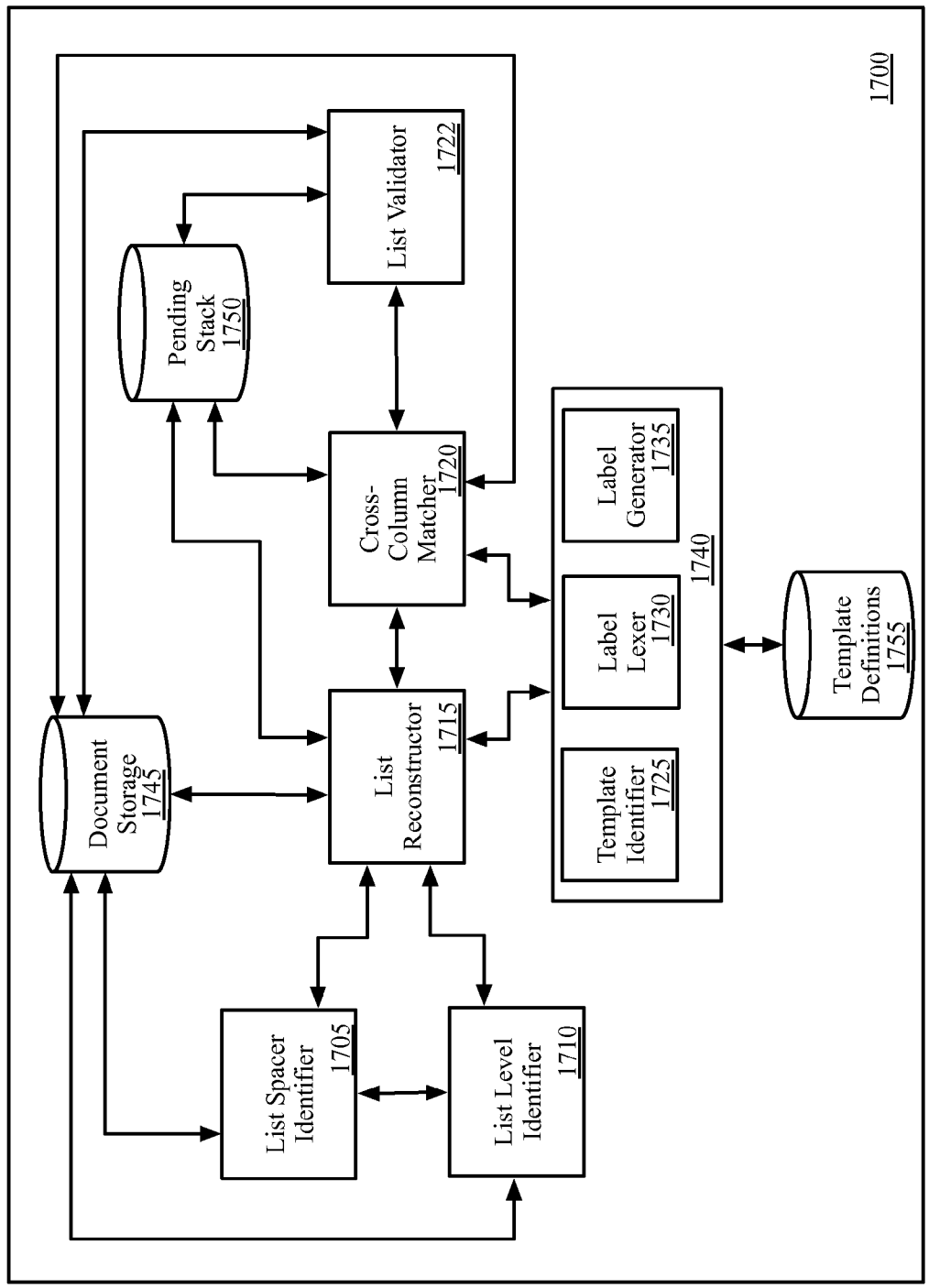
FIG. 17 conceptually illustrates the software architecture of a list reconstruction module of some embodiments.

In some embodiments, the processes described above are implemented as software running on a particular machine, such as a computer or a handheld device, or stored in a computer readable medium. FIG. 17 conceptually illustrates the software architecture of a list reconstruction module 1700 of some embodiments. In some embodiments, the list reconstruction module 1700 is a stand-alone application or is integrated into an application (e.g., as part of a document reconstruction application), while in other embodiments the application might be implemented within an operating system. Furthermore, in some embodiments, the module is provided as part of a server-based solution. In some such embodiments, the module is provided via a thin client. That is, the module runs on a server (e.g., as part of an application operating on the server) while a user interacts with the application via a separate machine remote from the server. In other such embodiments, the module is provided via a thick client. That is, the module is distributed from the server (e.g., as part of an application distributed from the server) to the client machine and runs on the client machine.

The list reconstruction module 1700 includes a list spacer identifier 1705, a list level identifier 1710, a list reconstructor 1715, a cross-column matcher 1720, a list validator 1722, and list template functions 1740. In addition, the list reconstruction module 1700 uses document storage 1745, storage for a stack of pending lists 1750, and template definitions 1755. The document storage 1745 stores information about one or more documents for which the list reconstruction module 1700 identifies and reconstructs lists. This information may include column and text line information, including bounds of these document objects. In some embodiments, the document storage 1745 stores a document object model, such as that described in US Application 2010/0174985, incorporated by reference above. The storage for a stack of pending lists 1750 stores a pending stack of possible lists during the list reconstruction process. In some embodiments, this information is stored in RAM. The template definitions store a list of alphabets and information about the alphabets needed by the list template functions 1740. In some embodiments, the document information, pending stack, and template definitions are stored in one physical storage. In other embodiments, this information is stored in different physical storages; for example, the document information and template definitions might be stored in permanent storages while the pending stack is stored in RAM. In addition, one of the storages might actually be split across multiple physical storages (e.g., the different documents might be stored on different disks).

The list spacer identifier 1705 identifies list spacers in a document using the document information 1745. In some embodiments, the list spacer identifier 1705 identifies potential split gaps in a column of the document, assembles spacers as vertical strips of overlapping split gaps, and determines whether the spacers meet the requirements for list spacers.

The list level identifier 1710 uses the list spacers and the document information 1745 to identify list levels for each text line with a list spacer. As described above, some embodiments start at the left edge of the baseline of the text line and determine how many list spacers are intersected between that point at the left column edge. This number is the list level for the text line.

The list reconstructor 1715 uses the list spacer and list level information and document information from document storage 1745 (e.g., information about the words and/or characters in the text lines) to reconstruct the lists within a column. In some embodiments, the list reconstructor 1715 performs some or all of process 800, shown in FIGS. 8A-8B.

The list reconstructor 1715 of some embodiments uses the list template functions 1740. These include the template identifier 1725, the label lexer 1730, and the label generator 1735. All of these functions use template definitions 1755, that include bullet or ordinal types and their alphabets. The template identifier 1725 identifies the template for a given list label. The template identifier examines the characters of a list label to identify its alphabet, and once the alphabet is identified determines the prefix and suffix for the list template. The label lexer 1730 takes as input the bullet or ordinal portion of a label and produces as output the item number represented by the label. The label generator 1735 essentially performs the inverse function of the label lexer 1730, converting an item number and label template into a label.

The cross-column matcher 1720 uses the output of the list reconstructor 1715 for multiple ordered columns and matches lists between the columns. In some embodiments, as described above, the cross-column matcher looks for matches that fit particular criteria between lists of a first column with an open end state and lists of the subsequent column with an open start state. To identify these matches, the cross-column matcher 1720 utilizes the list template functions 1740.

The list validator 1722 uses the output of the cross-column matcher (the final set of lists) and validates the lists. Any lists that do not fit the particular validation criteria are removed from the set of lists and any nested lists are modified as necessary. In some embodiments, these criteria include mandating that each list includes at least two items.

While many of the features have been described as being performed by one module (e.g., the list reconstructor 1715, the list spacer identifier 1705, etc.), one of ordinary skill in the art will recognize that the functions described herein might be split up into multiple modules. Similarly, functions described as being performed by multiple different modules might be performed by a single module in some embodiments (e.g., the cross-column matcher 1720 might be part of the list reconstructor 1715).

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
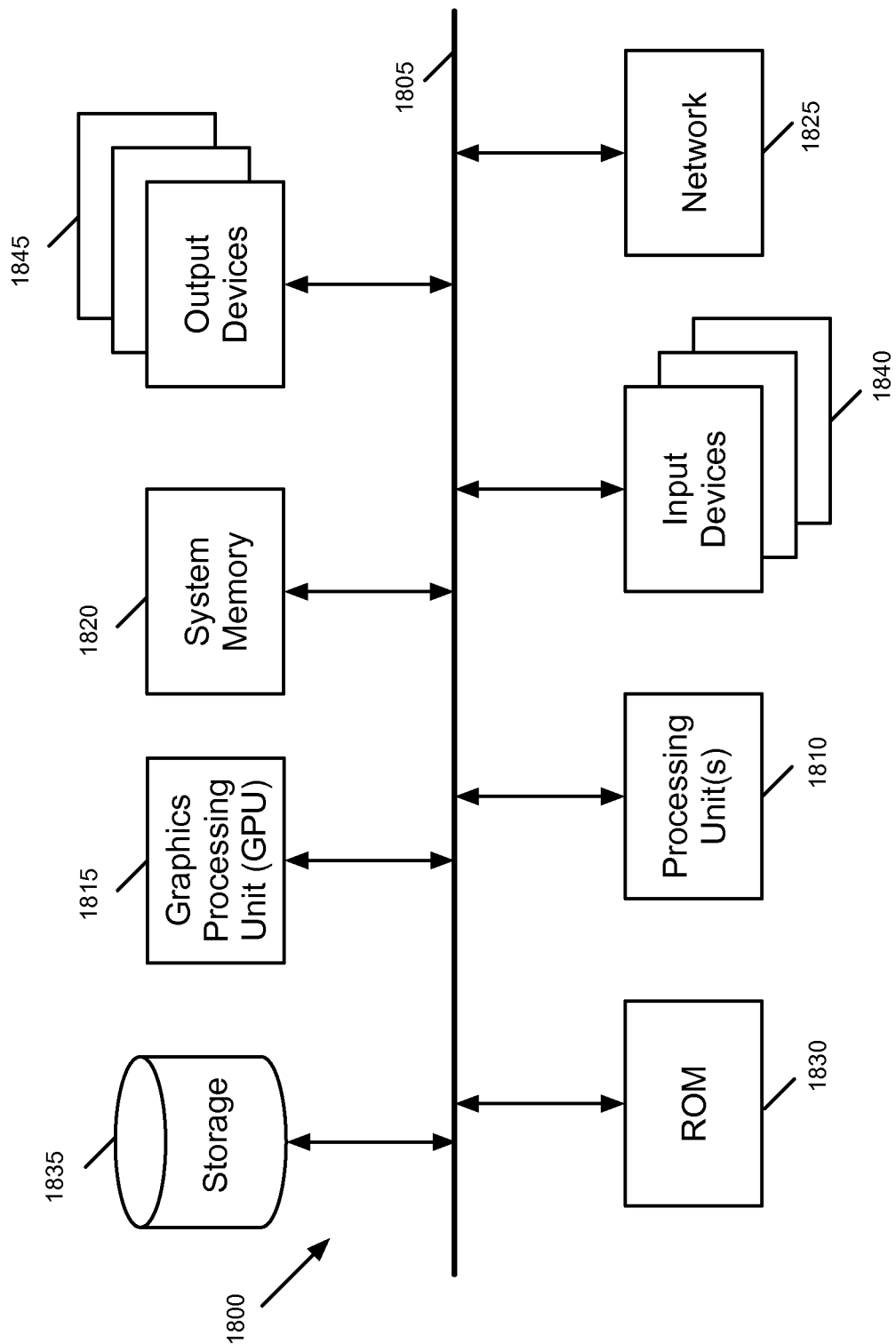
FIG. 18 conceptually illustrates an electronic system with which some embodiments of the invention are implemented.

FIG. 18 conceptually illustrates an electronic system 1800 with which some embodiments of the invention are implemented. The electronic system 1800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1800 includes a bus 1805, processing unit(s) 1810, a graphics processing unit (GPU) 1815, a system memory 1820, a network 1825, a read-only memory 1830, a permanent storage device 1835, input devices 1840, and output devices 1845. The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the GPU 1815, the system memory 1820, and the permanent storage device 1835.

From these various memory units, the processing unit(s) 1810 retrieves instructions to execute and data to process in order to execute the processes of the invention. The processing unit(s) may be a single processor or a multi-core processor in different embodiments. Some instructions are passed to and executed by the GPU 1815. The GPU 1815 can offload various computations or complement the image processing provided by the processing unit(s) 1810. In some embodiments, such functionality can be provided using CoreImage's kernel shading language.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash memory device, etc., and its corresponding drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor needs at runtime. In some embodiments, the invention's processes are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, the description herein assumes that the text is read left-to-right and top-to-bottom. One of ordinary skill in the art will recognize that similar processes could be used for text that is right-to-left and/or bottom-to-top (e.g., right-to-left languages). In addition, a number of the figures (including FIGS. 2, 7, 8A-8B, and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for analyzing a document comprising a plurality of primitive elements, the method comprising:

identifying a first set of hierarchically-organized lists in a first column and a second set of hierarchically-organized lists in a second column subsequent to the first column in the document, each of the first and second sets of hierarchically-organized lists comprising one or more list items identified by a list label;

determining that a first list in the first set of hierarchically-organized lists continues as a second list in the second set of hierarchically-organized lists based on an analysis of the list labels of a last list item in the first list and a first list item in the second list;

storing the first list and the second list as a single list structure associated with the document.

2. The method of claim 1, wherein determining that the first list in the first set of hierarchically-organized lists continues as the second list in the second set of hierarchically-organized lists comprises:

determining that the first list has an open end state and the second list has an open start state;

determining that an alphabet used for list labels in the first list is the same alphabet used for list labels in the second list; and determining that a header of the first list item in the second list follows a header of the last list item in the first list according to the alphabet.

3. The method of claim 1 further comprising determining that a third list in the first set of hierarchically-organized lists continues as a fourth list in the second set of hierarchically-organized lists.

4. The method of claim 3, wherein a relationship between a level of the first list and a level of the third list is the same as a relationship between a level of the second list and a level of the fourth list.

5. The method of claim 1, wherein the second column is immediately after the first column in a reading order of the document.

6. The method of claim 1, wherein at least one column exists between the first column and the second column within a reading order of the document.

7. A machine readable medium storing a program which when executed by at least one processing unit analyzes a document comprising a plurality of primitive elements, the program comprising sets of instructions for:

identifying a first set of hierarchically-organized lists in a first column and a second set of hierarchically-organized lists in a second column subsequent to the first column in the document, each of the first and second sets of hierarchically-organized lists comprising one or more list items identified by a list label;

determining that a first list in the first set of hierarchically-organized lists continues as a second list in the second set of hierarchically-organized lists based on an analysis of the list labels of a last list item in the first list and a first list item in the second list; and storing the first list and the second list as a single list structure associated with the document.

8. The machine readable medium of claim 7, wherein the set of instructions for determining that the first list in the first set of hierarchically-organized lists continues as the second list in the second set of hierarchically-organized lists comprises sets of instructions for:

determining that the first list has an open end state and the second list has an open start state;

determining that an alphabet used for list labels in the first list is the same alphabet used for list labels in the second list; and determining that a header of the first list item in the second list follows a header of the last list item in the first list according to the alphabet.

9. The machine readable medium of claim 7, wherein the program further comprises a set of instructions for determining that a third list in the first set of hierarchically-organized lists continues as a fourth list in the second set of hierarchically-organized lists.

10. The machine readable medium of claim 9, wherein a relationship between a level of the first list and a level of the third list is the same as a relationship between a level of the second list and a level of the fourth list.

11. The machine readable medium of claim 7, wherein the second column is immediately after the first column in a reading order of the document.

12. The machine readable medium of claim 7, wherein at least one column exists between the first column and the second column within a reading order of the document.

13. A non-transitory machine readable medium storing a program which when executed by at least one processing unit analyzes a document comprising a plurality of primitive elements, the program comprising sets of instructions for:

identifying different sets of lists for different columns of the document, each column ordered within the document based on a reading order;

identifying a first list in a first column of the document that has an open end state;

identifying a second list, in a second column of the document subsequent to the first column in the reading order, that has an open start state;

determining that the first list in the first column continues as the second list in the second column of the document; and storing the first list and the second list as a single list structure associated with the document.

14. The non-transitory machine readable medium of claim 13, wherein an alphabet used for list labels in the first list is a same alphabet used for list labels in the second list.

15. The non-transitory machine readable medium of claim 13, wherein an alignment, spacing and content of list items in the first list matches an alignment, spacing, and content of list items in the second list.

16. The non-transitory machine readable medium of claim 13, wherein the set of instructions for determining that the first list in the first column continues with the second list in the second column comprises sets of instructions for:

generating, using a label generation function, a next list item label for the first list; and determining that the next list item label matches a label of a first list item of the second list in the second column.

17. The non-transitory machine readable medium of claim 16, wherein the program further comprises sets of instructions for:

detecting more than one matching list between the first column and the second column; and comparing indentations of the matching lists to determine a best matching list between the first column and the second column.

18. The non-transitory machine readable medium of claim 13, wherein the second column in the document is immediately after the first column of the document in a reading order of the document.

19. The non-transitory machine readable medium of claim 13, wherein the program further comprises a set of instructions for determining that a third list in the first column continues as a fourth list in the second column.

20. The non-transitory machine readable medium of claim 19, wherein a relationship between a level of the first list and a level of the third list is the same as a relationship between a level of the second list and a level of the fourth list.

21. The non-transitory machine readable medium of claim 13, wherein the program further comprises a set of instructions for determining that a plurality of lists in the first column continue as a second plurality of lists in the second column with each list in the second plurality matched to a different list in the first plurality such that a set of all matched list levels in the second plurality are a monotonically increasing function of list levels to which they are matched in the first plurality.

22. A method for analyzing a document comprising a plurality of primitive elements, the method comprising:

identifying different sets of lists for different columns of the document, each column ordered within the document based on a reading order;

identifying a first list in a first column of the document that has an open end state;

identifying a second list, in a second column of the document subsequent to the first column in the reading order, that has an open start state;

determining that the first list in the first column continues as the second list in the second column of the document; and storing the first list and the second list as a single list structure associated with the document.

23. The method of claim 22, wherein an alignment, spacing and content of list items in the first list matches an alignment, spacing, and content of list items in the second list.

24. The method of claim 22, wherein determining that the first list in the first column continues with the second list in the second column comprises:

generating, using a label generation function, a next list item label for the first list; and determining that the next list item label matches a label of a first list item of the second list in the second column.

25. The method of claim 24 further comprising:

detecting more than one matching list between the first column and the second column; and comparing indentations of the matching lists to determine a best matching list between the first column and the second column.

* * * * *